(12) United States Patent
Shen et al.

(10) Patent No.: US 8,693,527 B2
(45) Date of Patent: Apr. 8, 2014

(54) RELAY APPARATUS AND RELAY METHOD

(75) Inventors: Jiyun Shen, Yokosuka (JP); Yasuhiro Oda, Yokosuka (JP); Tamami Maruyama, Yokohama (JP); Tatsuo Furuno, Yokosuka (JP); Tomoyuki Ohya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 285 days.

(21) Appl. No.: 13/223,846

(22) Filed: Sep. 1, 2011

(65) Prior Publication Data
US 2012/0057619 A1 Mar. 8, 2012

(30) Foreign Application Priority Data
Sep. 2, 2010 (JP) ................. 2010-196307

(51) Int. Cl.
*H04B 3/36* (2006.01)
(52) U.S. Cl.
USPC ........................................... 375/211
(58) Field of Classification Search
USPC .......................... 375/211, 297, 260
See application file for complete search history.

(56) References Cited

U.S. PATENT DOCUMENTS

| | | | |
|---|---|---|---|
| 7,957,693 B2* | 6/2011 | Shimizu et al. | 455/11.1 |
| 2005/0130672 A1* | 6/2005 | Dean et al. | 455/456.1 |
| 2005/0190821 A1 | 9/2005 | Fujii et al. | |
| 2009/0053994 A1 | 2/2009 | Senarath et al. | |
| 2012/0058719 A1* | 3/2012 | Gan et al. | 455/10 |

FOREIGN PATENT DOCUMENTS

| | | |
|---|---|---|
| EP | 1 564 911 A1 | 8/2005 |
| JP | 4-233338 A | 8/1992 |
| JP | 2004-7279 A | 1/2004 |
| JP | 2005-229524 A | 8/2005 |
| JP | 2005-252533 A | 9/2005 |
| JP | 2006-148482 | 6/2006 |
| JP | 2012-23598 A | 2/2012 |

OTHER PUBLICATIONS

Office Action issued Jul. 24, 2012 in Japanese Patent Application No. 2010-196307 with English language translation.
Extended European Search Report issued Oct. 26, 2012 in Patent Application No. 11179822.9.

* cited by examiner

*Primary Examiner* — Kevin Kim
(74) *Attorney, Agent, or Firm* — Oblon, Spivak, McClelland, Maier & Neustadt, L.L.P.

(57) ABSTRACT

A relay apparatus is disclosed for relaying a signal from a transmitter to a receiver in a MIMO (Multiple Input Multiple Output) based communication system, comprising: a power difference determination unit configured to determine a difference of reception levels between a direct wave and a relayed wave based on positional relationship among the transmitter, the relay apparatus and the receiver, the direct wave traveling from the transmitter to the receiver without the relay apparatus, the relayed wave traveling from the transmitter to the receiver via the relay apparatus; a gain determination unit configured to determine an amplification gain of the relay apparatus to make the difference smaller; and a transmitting unit configured to amplify the signal from the transmitter at the determined amplification gain and transmit the amplified signal to the receiver.

4 Claims, 11 Drawing Sheets

RELAY APPARATUS AND RELAY METHOD

BACKGROUND OF THE INVENTION

1. Field of the Invention

The present invention relates to a relay apparatus and a relay method.

2. Description of the Related Art

As techniques for improving throughput in radio communications, a MIMO (Multiple Input Multiple Output) scheme or a multi-antennas scheme is present. The MIMO scheme improves the throughput through simultaneous signal transmissions from multiple antennas at a uniform frequency.

FIG. 1 schematically illustrates the MIMO scheme. In the MIMO scheme, n streams, stream 1 to stream n, are transmitted from n antennas in a transmitter separately and are received at n antennas in a receiver via different radio propagation paths. The receiver can use the spacially different radio propagation paths to reconstruct the transmitted information piece 1 to piece n through signal detection of the n streams, stream 1 to stream n, from the n received signals.

In this manner, the MIMO scheme makes use of differences of the radio propagation paths among the multiple transmitter antennas and the multiple receiver antennas. Accordingly, in an exemplary case where various radio propagation paths are present due to existence of an obstacle along the radio propagation paths (multipath environment case), the receiver can easily achieve the signal detection in accordance with the MIMO scheme. However, the reception power tends to be attenuated due to scattering of radio waves caused by the obstacle, as illustrated in FIG. 2. On the other hand, in an exemplary line-of-sight environment, the radio propagation paths slightly differ from each other, which makes the signal detection at the receiver difficult. In the line-of-sight environment, however, the reception power does not drop substantially, as illustrated in FIG. 3.

For this reason, in the line-of-sight environment, it is difficult to improve the throughput in accordance with the MIMO scheme. In order to address this problem, it is conceived that a relay apparatus is provided between the transmitter and the receiver. The receiver receives a direct wave incoming from the transmitter directly and a relayed wave traveling from the transmitter via the relay apparatus and performs the signal detection on their composite wave. By using the relay apparatus to make the radio propagation paths intentionally complicated, the receiver could easily perform the signal detection even in the line-of-sight environment. Some conventional MIMO based relay methods are described in JP 2006-148482, for example.

However, even if the installation of the relay apparatus enables the receiver to receive the direct wave and the relayed wave, there are some cases where the signal detection by the receiver in accordance with the MIMO scheme remains difficult.

FIG. 4 illustrates one of the above cases. In the left side in FIG. 4, a transmitter, a relay apparatus and a receiver are schematically illustrated. The receiver receives a direct wave incoming from the transmitter directly and a relayed wave incoming via the relay apparatus and synthesizes the direct wave and the relayed wave. In general, the relay wave has a phase different from that of the direct wave. For convenience, it is assumed that the phase difference between the direct wave and the relayed wave is equal to $\phi$. Then, the synthesis of the direct wave and the relayed wave can be achieved through vector addition. As a result, if the relayed wave has an extremely small amplitude, for example, the composite wave would be approximate to the direct wave, as illustrated in the upper-right part in FIG. 4. In the case where the composite wave is approximate to the direct wave, the receiver could substantially use only the direct wave for the signal detection, which may make the signal detection difficult as in the case of the line-of-sight environment. On the other hand, if the direct wave has an extremely small amplitude, the composite wave would be approximate to the relayed wave, as illustrated in the lower-right part in FIG. 4. In the case where the composite wave is approximate to the relayed wave, the receiver could substantially use only the relayed wave for the signal detection, which may make the signal detection difficult as in the case of the line-of-sight environment. In this manner, in accordance with the conventional scheme, even if the relay apparatus is utilized in the MIMO scheme, the signal detection may encounter the difficulties.

SUMMARY OF THE INVENTION

One object of the present invention is to facilitate the signal detection for a composite wave of a direct wave traveling from a transmitter to a receiver without a relay apparatus and a relayed wave traveling from the transmitter to the receiver via the relay apparatus in a MIMO based communication system.

One aspect of the present invention relates to a relay apparatus for relaying a signal from a transmitter to a receiver in a MIMO based communication system, comprising: a power difference determination unit configured to determine a difference of reception levels between a direct wave and a relayed wave based on positional relationship among the transmitter, the relay apparatus and the receiver, the direct wave traveling from the transmitter to the receiver without the relay apparatus, the relayed wave traveling from the transmitter to the receiver via the relay apparatus; a gain determination unit configured to determine an amplification gain of the relay apparatus to make the difference smaller; and a transmitting unit configured to amplify the signal from the transmitter at the determined amplification gain and transmit the amplified signal to the receiver.

Another aspect of the present invention relates to a relay method for relaying a signal from a transmitter to a receiver in a MIMO based communication system, comprising: determining a difference of reception levels between a direct wave and a relayed wave based on positional relationship among the transmitter, the relay apparatus and the receiver, the direct wave traveling from the transmitter to the receiver without the relay apparatus, the relayed wave traveling from the transmitter to the receiver via the relay apparatus; determining an amplification gain of the relay apparatus to make the difference smaller; and amplifying the signal from the transmitter at the determined amplification gain and transmitting the amplified signal to the receiver.

According to the aspects of the present invention, it is possible to facilitate the signal detection for a composite wave of a direct wave traveling from a transmitter to a receiver without a relay apparatus and a relayed wave traveling from the transmitter to the receiver via the relay apparatus in a MIMO based communication system.

DESCRIPTION OF THE PREFERRED EMBODIMENTS

Embodiments of the present invention are described in detail below.

[1. Principle of the Present Invention]

Figure 1:
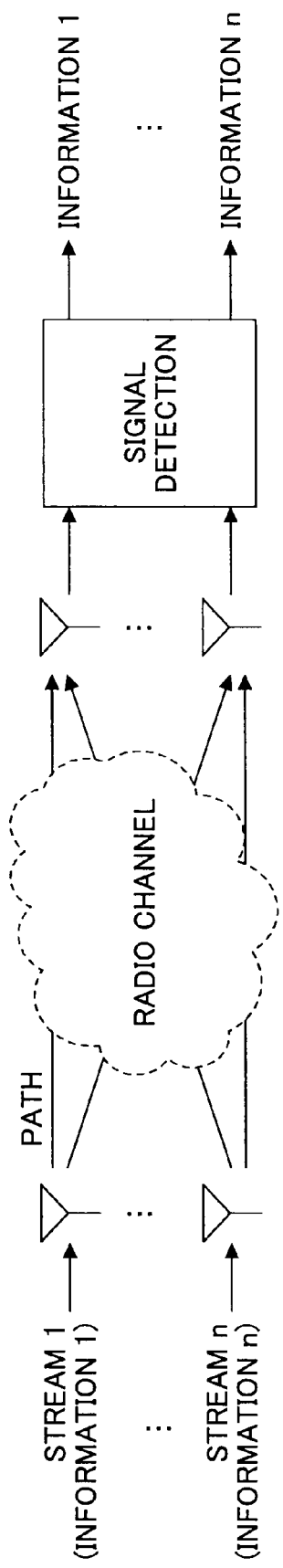
FIG. 1 is a conceptual view of signal transmissions in accordance with the MIMO scheme.
Figure 2:
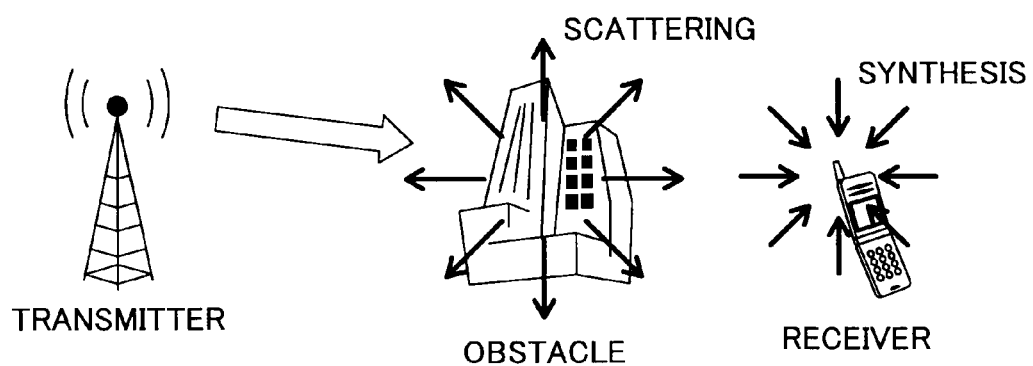
FIG. 2 illustrates a non-line-of-sight radio propagation environment.
Figure 3:
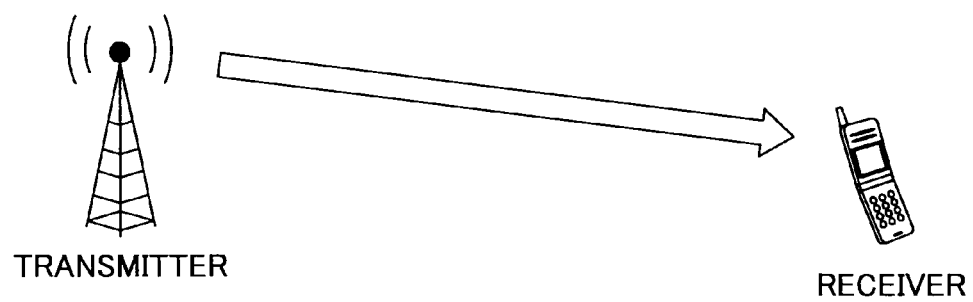
FIG. 3 illustrates a line-of-sight radio propagation environment.
Figure 4:
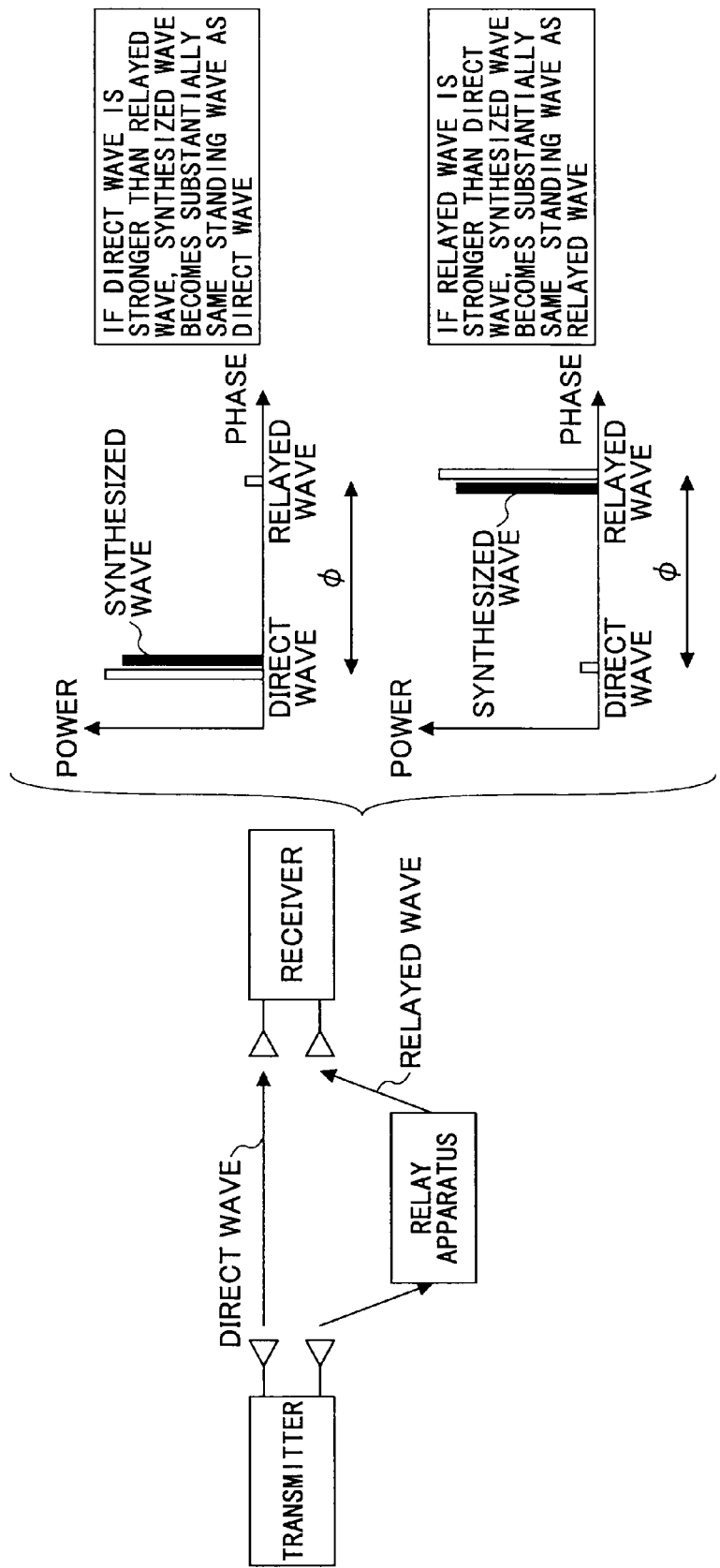
FIG. 4 illustrates one problem in a conventional MIMO scheme.
Figure 5:
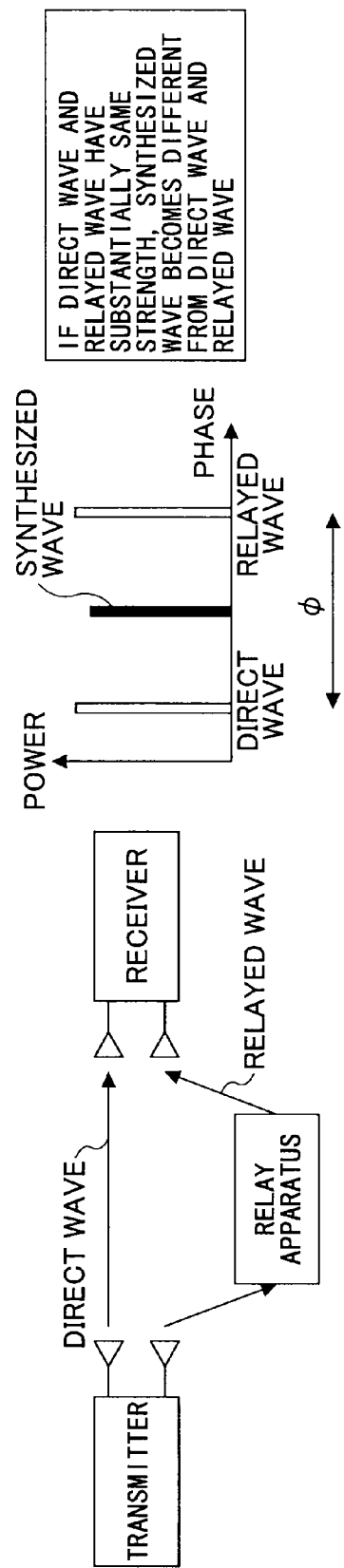
FIG. 5 illustrates one principle of the present invention.

FIG. 5 illustrates one principle of the present invention. As stated in conjunction with FIG. 4, if a direct wave and a relayed wave have significantly different power levels, the signal detection for a composite wave by a receiver would be difficult. According to the present invention, a relay apparatus amplifies the relayed wave to a power level enough that the receiver can receive the direct wave and the relayed wave at an almost same reception level and then transmits the amplified relayed wave to the receiver. The amplification gain at the relay apparatus can be determined based on geographical positional relationship among the transmitter, the relay apparatus and the receiver. As illustrated in the right side in FIG. 5, if the receiver receives the direct wave and the relayed wave at similar strengths, the composite wave would have a phase different from any phase of the direct wave and the relayed wave, which can facilitate the signal detection by the receiver.

[2. Relay Apparatus]

Figure 6:
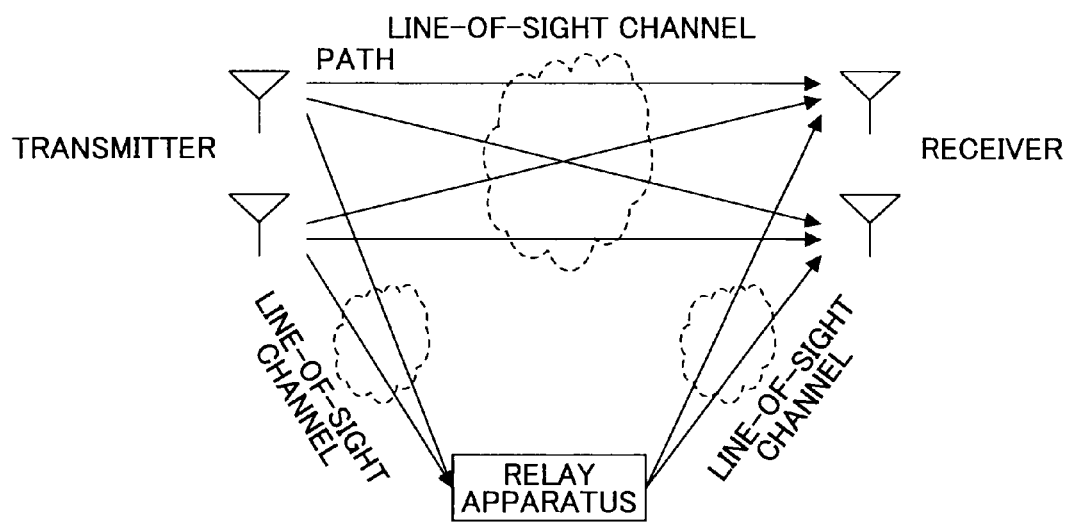
FIG. 6 illustrates a relay apparatus provided between a transmitter and a receiver according to one embodiment.

FIG. 6 illustrates a relay apparatus provided between a transmitter and a receiver according to one embodiment of the present invention. The transmitter and the receiver transmit and receive signals in accordance with the MIMO scheme, respectively. The relay apparatus may be any appropriate apparatus that can relay radio waves from the transmitter to the receiver.

Figure 7:
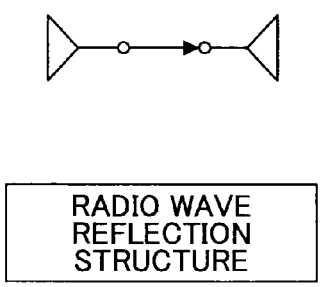
FIG. 7 illustrates an exemplary passive type of relay apparatus.

As illustrated in FIG. 7, for example, the relay apparatus may be a passive type of relay apparatus such as a radio wave reflector plate serving to simply reflect a radio wave. In cases where the radio wave reflector plate or a reflector is utilized, the amplification gain at the relay apparatus is determined mainly based on the size of the reflector (specifically, the area of the reflector). Thus, the relay apparatus having a desired level of the amplification gain can be realized by determining the area leading to a required level of the amplification gain based on the geographical positional relationship among the transmitter, the relay apparatus and the receiver.

Figure 8:
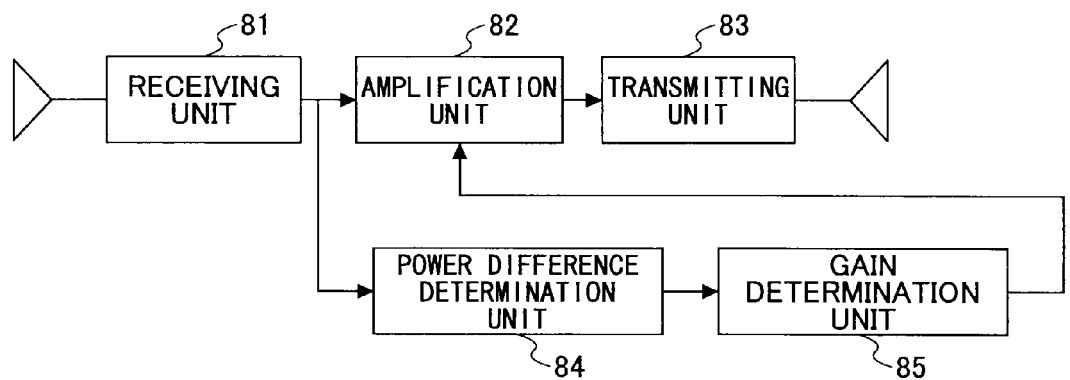
FIG. 8 illustrates an exemplary active type of relay apparatus.

As illustrated in FIG. 8, the relay apparatus may be an active type of relay apparatus having an amplification function and so on. In the illustrated relay apparatus, a receiving unit 81 receives a signal from a transmitter. An amplification unit 82 amplifies the received signal. A transmitting unit 83 transmits the amplified signal to a receiver. The amplification gain at the amplification unit can be determined based on the geographical positional relationship among the transmitter, the relay apparatus and the receiver. Specifically, a power difference determination unit 84 determines a difference of reception levels between a direct wave and a relayed wave at the receiver. Then, a gain determination unit 85 determines the amplification gain so that the difference can be made smaller. Although the active type of relay apparatus has a more complicated arrangement than the passive type of relay apparatus as illustrated in FIG. 7, the active type of relay apparatus is advantageous in that variable control of the amplification gain can be achieved.

Figure 9:
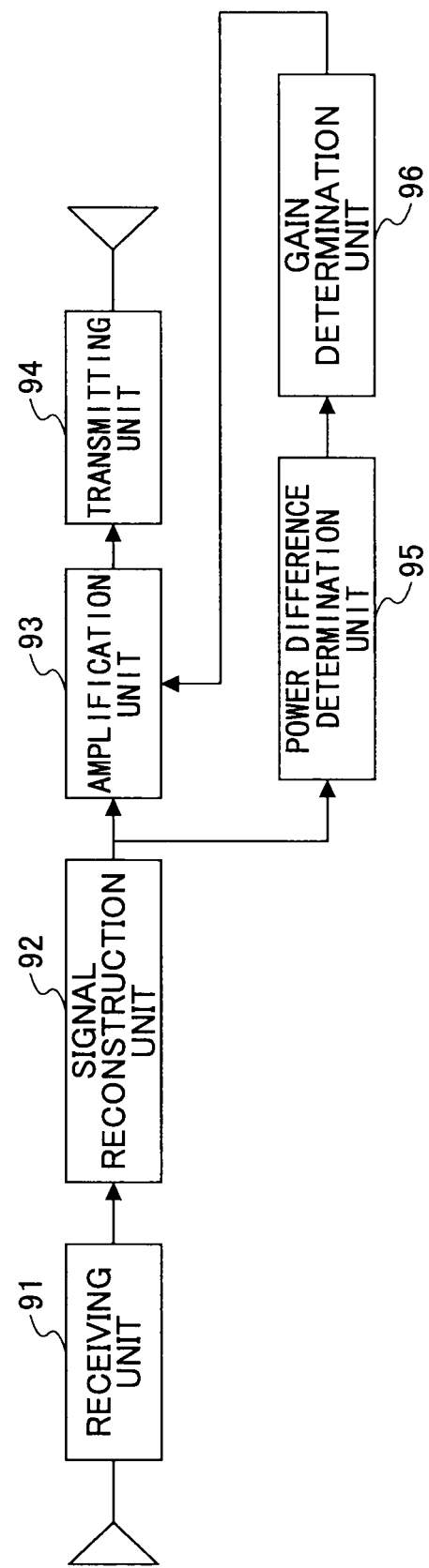
FIG. 9 illustrates another exemplary active type of relay apparatus.

As illustrated in FIG. 9, the relay apparatus may be an active type of relay apparatus having a signal reconstruction function and so on as well as the above-mentioned amplification function. In the illustrated relay apparatus, a receiving unit 91 receives a signal from a transmitter. Then, a signal reconstruction unit 92 reconstructs the received signal to generate a noise-free signal. An amplification unit 93 amplifies the noise free signal, and a transmitter unit 94 transmits the amplified signal to a receiver. The amplification gain at the amplification unit can be determined based on the geographical positional relationship among the transmitter, the relay apparatus and the receiver. Specifically, a power difference determination unit 95 determines a difference of reception levels between a direct wave and a relayed wave at the receiver. A gain determination unit 96 determines the amplification gain so that the difference can be made smaller. Although this type of relay apparatus has a more complicated arrangement than the relay apparatus as illustrated in FIG. 8, it is advantageous in that the noise-free signal can be relayed.

[3. Amplification Gain Determination Method]

Figure 10:
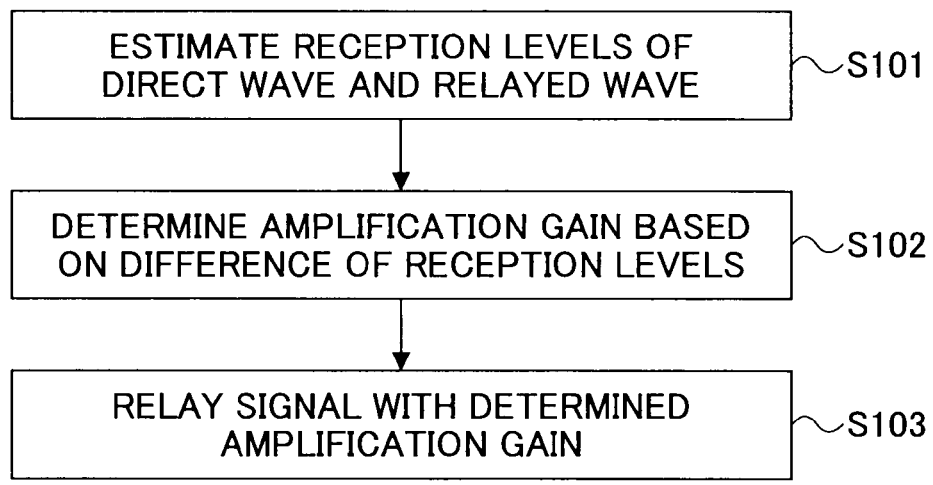
FIG. 10 is a flowchart illustrating a method for determining an amplification gain at a relay apparatus.

FIG. 10 illustrates a method for determining the amplification gain at a relay apparatus. It is assumed that the geographical positional relationship among the transmitter, the relay apparatus and the receiver is known.

At step S101, the relay apparatus estimates reception levels of a direct wave and a relayed wave at the receiver. In an initial case, the amplification gain at the relay apparatus is set to an initial value. The reception levels may be estimated in accordance with any appropriate method in this technical field. As one example, a distance attenuation model can be used to estimate the reception levels. Alternatively, the reception levels may be actually measured.

Figure 11:
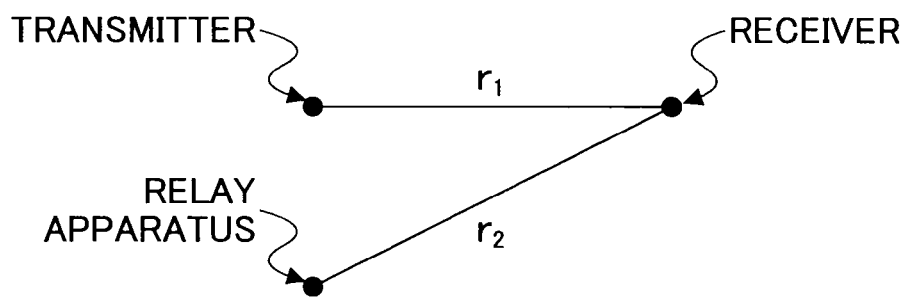
FIG. 11 schematically illustrates geographical positional relationship among a transmitter, a relay apparatus and a receiver.
Figure 12:
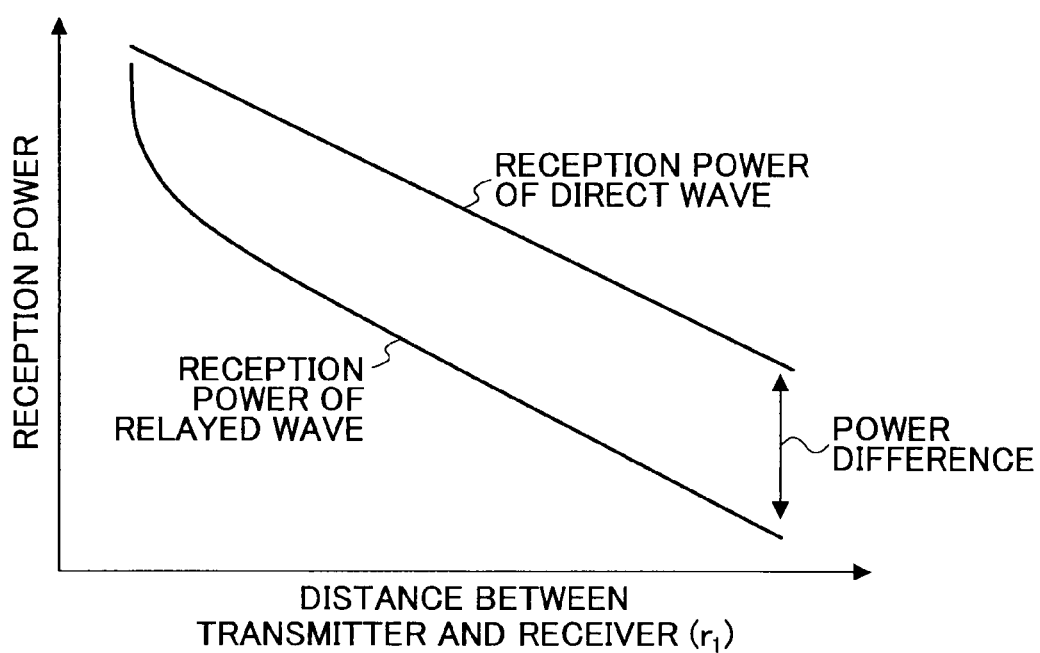
FIG. 12 illustrates estimation values of reception power of a direct wave and a relayed wave.

FIG. 11 illustrates exemplary positional relationship among a transmitter, a relay apparatus and a receiver. FIG. 12 illustrates estimation values of reception levels of a direct wave and a relayed wave that are received at the receiver under the positional relationship as illustrated in FIG. 11. The reception level may be represented as any known appropriate amount in this technical field. For example, the reception level may be represented as an RSCP (Received Signal Code Power), an RSSI (Received Signal Strength Indicator), a path loss, an SIR (Signal to Interference Ratio), an SINR (Signal to Interference plus Noise Ratio), an S/N (Signal to Noise ratio), an $E_c/N_o$ and so on. For convenience, it is assumed that the reception level corresponds to reception power. In FIG. 12, it is assumed that the environment among the transmitter, the relay apparatus and the receiver corresponds to a line-of-sight environment, but the present invention is not limited to this assumption. As stated below, the environment may be a non-line-of-sight environment. In general, as the distance between apparatuses is greater, the reception levels of the direct wave and the relayed wave are lower. Since the distance $r_2$ between the relay apparatus and the receiver is greater than the distance $r_1$ between the transmitter and the receiver, the relayed wave has lower reception power than the direct wave.

Figure 13:
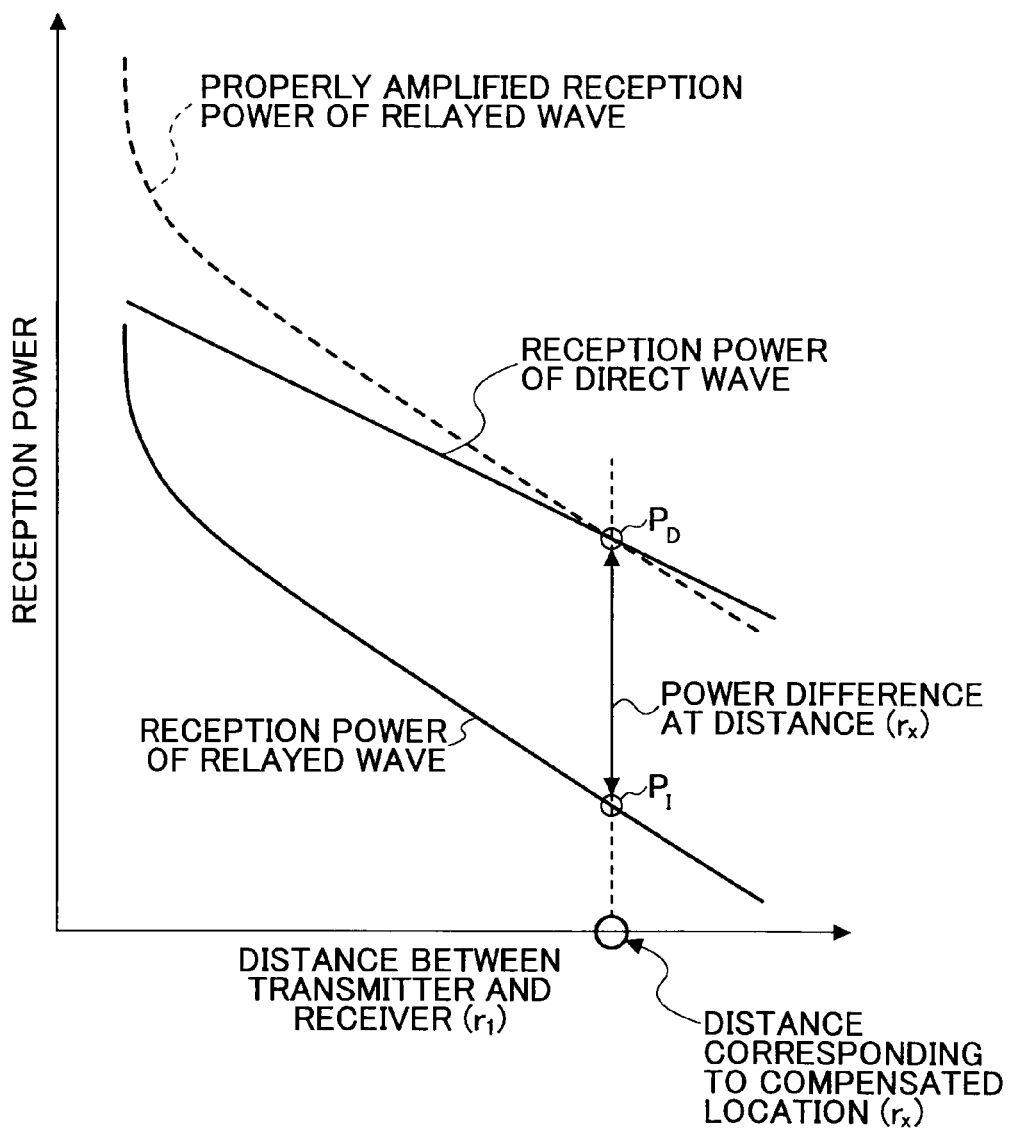
FIG. 13 illustrates exemplary determination of an amplification gain based on reception power differences.

At step S102 in FIG. 10, the amplification gain is determined by calculating a difference of reception levels between a direct wave and a relayed wave at a position corresponding to a desired distance. This calculation is described with reference to FIG. 13. It is assumed that the reception power of the direct wave at the position of the receiver, that is, the position where compensation is desired, is represented as $P_D$ and that the reception power of the relayed wave at that position is represented as $P_I$. Then, the difference between the reception power levels $(P_D-P_I)$ is determined as the amplification gain at the relay apparatus.

At step S103 in FIG. 10, a signal from transmitter is amplified at the relay apparatus and relayed to the receiver. The amplification gain at the relay apparatus is equal to the value determined at step S102. The relayed wave as appropriately amplified in this manner is attenuated as illustrated in a dashed line in FIG. 13, and the reception power at the receiver becomes equal to $P_D$. Since the receiver receives the relayed wave at an almost same level as the direct wave, the receiver can perform the signal detection on the composite wave of the direct wave and the relayed wave appropriately.

Figure 14:
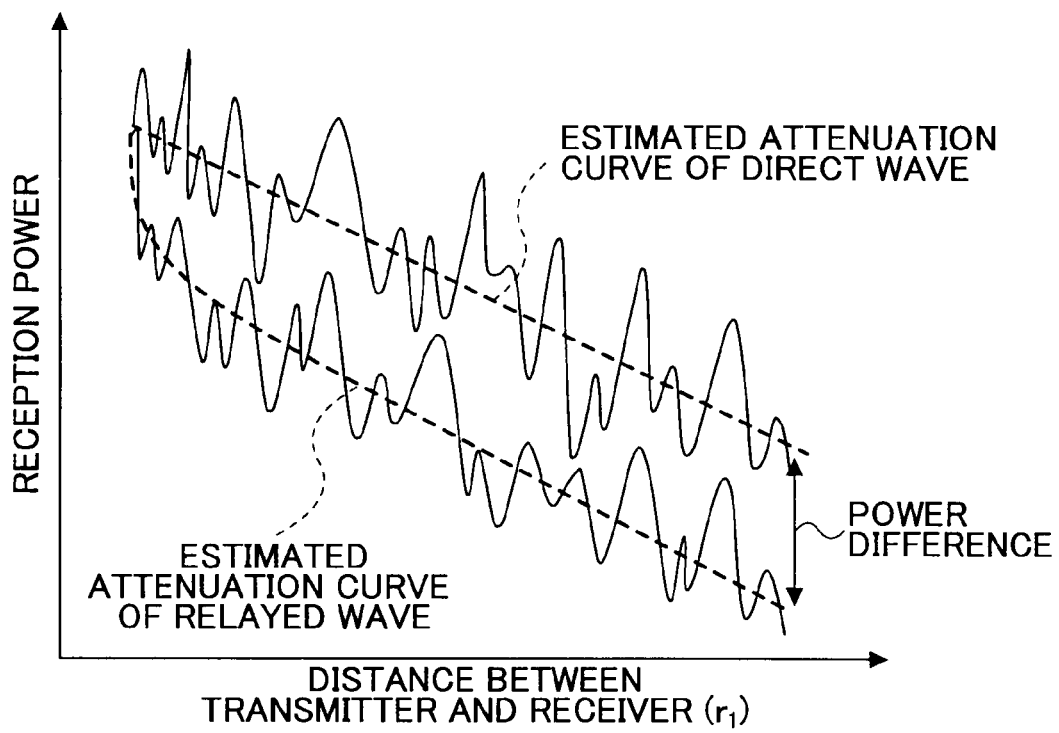
FIG. 14 illustrates estimation values of reception power of a direct wave and a relayed wave in a non-line-of-sight environment.

Although it is conceived at step S101 that the reception power of the direct wave and the relayed wave is estimated in the line-of-sight environment, the estimation may be conducted for a non-line-of-sight environment. In the case of non-line-of-sight environment, as illustrated in FIG. 14, the reception power drastically varies due to fading such as shadowing. In this case, it is preferred that the reception power be averaged over the distance of a certain length and the amplification gain be determined based on the difference between averages of the reception power.

Although the present invention have been described with reference to the specific embodiments, these embodiments are simply illustrative. Variations, modifications, alterations and replacements may be made by those skilled in the art without departing from the scope of the present invention. For example, the present invention may be applied to any appropriate mobile communication system where the MIMO scheme is utilized. Although specific values are used in the above descriptions to facilitate the understanding of the present invention, the values are just examples, and any other appropriate values may also be used unless otherwise mentioned. The distinctions between the embodiments are not essential for the present invention, and the embodiments may be used individually or in combination. Also, subject matter described in one embodiment may be applied to subject matter in another embodiment unless they are contradictory. Although functional block diagrams are used to describe apparatuses in the above embodiments, the apparatuses may be implemented by hardware, software, or a combination of them. Software may be stored in any appropriate storage medium such as a random access memory (RAM), a flash memory, a read only memory (ROM), an EPROM, an EEPROM, a register, a hard disk (HD), a removable disk, or a CD-ROM. The present invention is not limited to the above-mentioned embodiments, various variations, modifications, substitutions and replacements are included in the present invention without deviating the sprit of the present invention.

The present application is based on Japanese Priority Application No. 2010-196307 filed on Sep. 2, 2010, the entire contents of which are hereby incorporated herein by reference.

What is claimed is:

1. A relay apparatus for relaying a signal from a transmitter to a receiver in a MIMO based communication system, comprising:
   a power difference determination unit configured to determine a difference of reception levels between a direct wave and a relayed wave based on positional relationship among the transmitter, the relay apparatus and the receiver, the direct wave traveling from the transmitter to the receiver without the relay apparatus, the relayed wave traveling from the transmitter to the receiver via the relay apparatus;
   a gain determination unit configured to determine an amplification gain of the relay apparatus to make the difference smaller; and
   a transmitting unit configured to amplify the signal from the transmitter at the determined amplification gain and transmit the amplified signal to the receiver,
   wherein if a communication environment is not a non-line-of-sight environment, the difference is determined as a difference of reception levels between the direct wave and relayed wave, and if the communication environment is a non-line-of-sight environment, the difference is determined as a difference of averaged reception levels between the direct wave and the relayed wave.

2. The relay apparatus as claimed in claim 1, wherein the power difference determination unit estimates the reception levels of the direct wave and the relayed wave in accordance with a distance attenuation model.

3. A relay method for relaying a signal from a transmitter to a receiver in a MIMO based communication system, comprising:
   determining a difference of reception levels between a direct wave and a relayed wave based on positional relationship among the transmitter, the relay apparatus and the receiver, the direct wave traveling from the transmitter to the receiver without the relay apparatus, the relayed wave traveling from the transmitter to the receiver via the relay apparatus;
   determining an amplification gain of the relay apparatus to make the difference smaller; and
   amplifying the signal from the transmitter at the determined amplification gain and transmitting the amplified signal to the receive receiver,
   wherein if a communication environment is not a non-line-of-sight environment, the difference is determined as a difference of reception levels between the direct wave and relayed wave, and if the communication environment is a non-line-of-sight environment, the difference is determined as a difference of averaged reception levels between the direct wave and the relayed wave.

4. The relay method as claimed in claim 3, wherein the determining the difference comprises estimating the reception levels of the direct wave and the relayed wave in accordance with a distance attenuation model.

* * * * *